Figure 1:
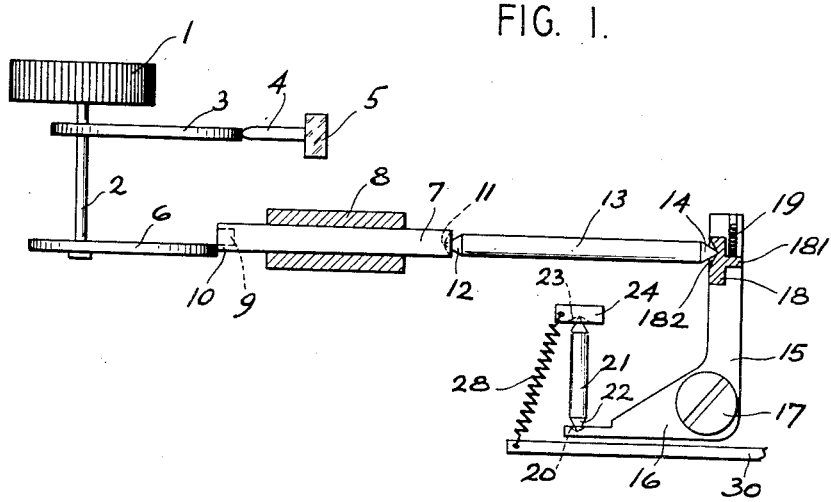

Nov. 9, 1954     O. MÜLLER     2,693,745

DEVICE FOR ADJUSTING THE OBJECTIVE IN PHOTOGRAPHIC CAMERAS

Filed Jan. 30, 1951     2 Sheets-Sheet 1

INVENTOR.
OSKAR MULLER
BY Mock & Blum
ATTORNEYS

Nov. 9, 1954  O. MÜLLER  2,693,745
DEVICE FOR ADJUSTING THE OBJECTIVE IN PHOTOGRAPHIC CAMERAS
Filed Jan. 30, 1951  2 Sheets-Sheet 2

INVENTOR.
OSKAR MULLER
BY Mock & Blum
ATTORNEYS

United States Patent Office 2,693,745
Patented Nov. 9, 1954

2,693,745

DEVICE FOR ADJUSTING THE OBJECTIVE IN PHOTOGRAPHIC CAMERAS

Oskar Müller, Braunschweig, Germany, assignor to Voigtländer & Sohn Aktiengesellschaft, Braunschweig, Germany, a corporation of Germany Application January 30, 1951, Serial No. 208,499

Claims priority, application Switzerland February 6, 1950

4 Claims. (Cl. 95—45)

This invention relates to a device for adjusting the objective in photographic cameras and has particular relation to a device of this type for adjusting the objective by means of elements arranged in the camera casing.

The main object of this invention is to provide a device of the above mentioned type which safely provides for parallel movement of the objective exactly to the desired position and comprises a transmission system which is substantially free from play.

Other objects and the advantages of the invention will be apparent from the appended drawings and the following specification which illustrate by way of example some embodiments of the invention.

It has been known that sharp focusing is brought about in photographic cameras by displacement of the objective, which can be effected in various ways. In folding cameras of older construction, a carriage movable on the base board of the camera was displaced along a scale in accordance with the distance of the object and the objective carrier member was moved together with said carriage. The displacement can be also effected by gripping the objective or objective carrier proper, in the case of cameras having a base board, as well as in other camera types. Furthermore, adjustment of the objective may be also effected by means of a rotatable button and a transmission gear arranged in the camera casing. Each of these known methods has its advocates. For example, adjustment by the use of means arranged in the camera casing has the advantage that the operator's hand need not handle the objective so that the camera can be firmly held by the operator's hand.

The device according to the present invention, which belongs to this last mentioned type, is described in the following in connection with a coupled range finder. However it is to be understood that the device of my invention is not limited to application in connection with a coupled range finder and may be successfully used also independently from such range finder. The embodiment in which the device of my invention is utilized in connection with a coupled range finder has been selected for illustration, because it represents a very frequent case of application.

In order to cause displacement of the relatively heavy photographic objective by means of an actuating button of the camera in such manner that the objective is moved exactly to the desired position, it is necessary that the transmission gear be free from play. Its elements should be easily movable and free from jamming, and its manufacturing cost should not exceed certain low limits. Furthermore, an exactly parallel displacement of the objective board should take place.

The known devices of this type do not meet the above requirements. If a steep thread, in combination with the necessary cog wheels for transmission to the range finder, is used, the cog wheels are not free from play even if they are new and not affected by wear. Moreover, the manufacture of a suitable steep thread, which would have to be provided with more than 25 turns, is difficult and expensive.

In the device of the present invention, no cog wheels or multiplex steep threads are used and said device provides for constant freedom from play as well as smooth operation and a minimum of friction. Moreover, the device can be easily readjusted and its assemblage is simple.

The transmission gear according to my invention has one or more members acting like levers, and said members are linked to a gear box or frame, or the like, built into the camera, or linked to the camera casing proper. Connection between these members is brought about by pin-like elements loosely inserted between said members, said elements being held in place by holding the lever members under spring impulse against points of said elements. The objective board is caused to be displaced by positive rectilinear movement.

The springs acting on the members of the transmission gear are preferably arranged in such manner that the spring impulse acts in the direction from the objective board to the rotatable button of the range finder. In this manner, the objective board is drawn back, i. e. to the infinity position of the objective. At least one member of the transmission system acts by the points of two pins on the objective board. The latter are lifted from the other side by the action of a swinging lever the pivot of which is linked to the camera casing or gear casing or frame. The system of transmission gear can be adjusted at any time. In order to eliminate inaccuracies or errors of manufacture in the system, and to provide for the necessary exactness in the adjustment of the photographic objective, one arm of the angle lever is provided with a displaceable element which is adapted to change i. e. reduce or increase the length of the lever. As a particularly simple means, I prefer the use of a rotatable disc to be eccentrically engaged by a point of the pin to be adjusted. Depending on the amount of adjustment in comparison to the normal position, the point of engagement of the pin at the lever will be located at a higher or lower level and will lengthen or shorten the effective length of the lever correspondingly. I prefer to apply adjusting means also to the objective board, which is simultaneously utilized in focusing the objective. The transmission member, such as a pin, bearing against the eccentric sheave arranged on the adjusting shaft of the range finder, is rotated during its displacement, in order to obtain rolling of the pin along the curve of the eccentric disc, and thus eliminate friction. Rotation of this pin can be attained in a particularly simple manner by causing only the outer rim of the end portion of the pin to bear against the eccentric disc. This pin is preferably provided with a bearing.

The appended drawings illustrate by way of example an embodiment of the invention, to which the invention is not limited.

Figure 2:
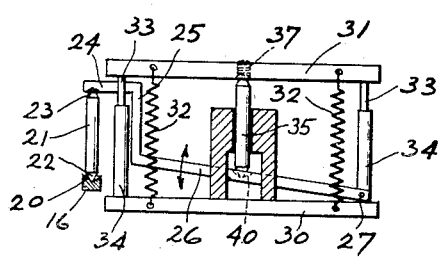
Figure 3:
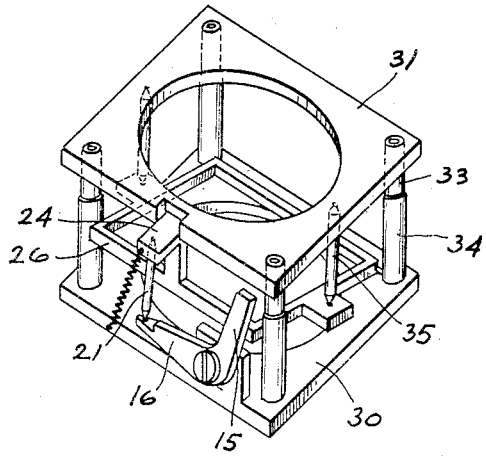
Figure 4:
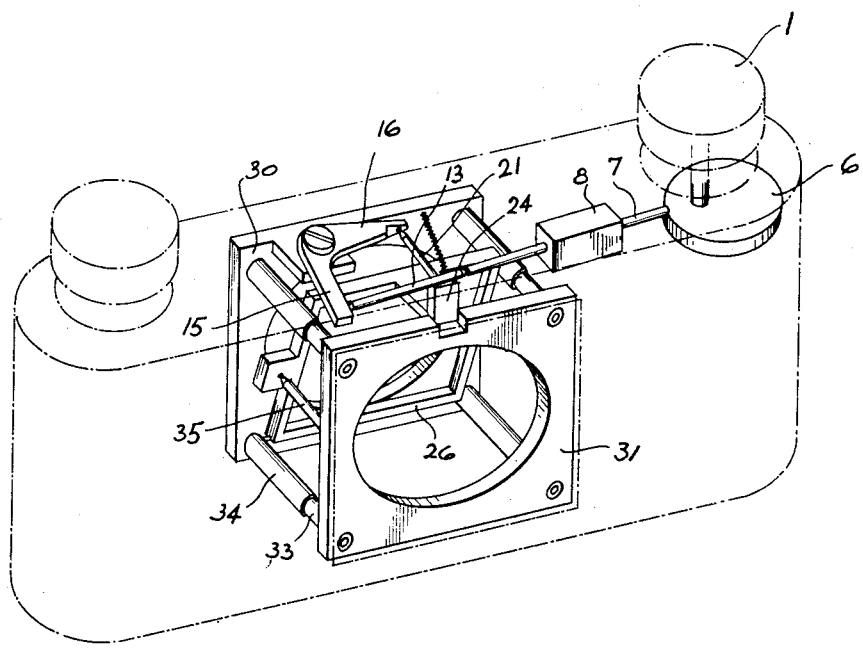

In the appended drawings, Figure 1 is a diagrammatical illustration of the members of the transmission gear; Figure 2 diagrammatically illustrates the means for lifting the objective board, in side view, partly in section; Figure 3 is a perspective view of the gear box for the lifting means shown in Figure 2, some details being omitted in this figure for the sake of clarity. Figure 4 illustrates the arrangement of the device shown in Figure 3, in the camera casing.

In the embodiment illustrated in the drawings, the transmission system according to the invention comprises the following sequence of members, starting with the actuating button:

At one end of a rangefinder, for example on its left side, an adjusting or setting button 1 is seated. Eccentric sheaves 6 and 3 are fastened to the same shaft 2, under button 1. During its rotation, upper eccentric disc 3 causes, by means of one or more intermediate members 4, swinging of adjusting mirror 5 of the rangefinder. The lower eccentric 6 acts in the adjustment of the objective board by means of a gear system.

A spring-loaded transmission pin 7 is held against eccentric sheave 6 in positive contact and is rectilinearly guided by bearing 8. At its end adjacent eccentric disc 6, said pin 7 is provided with a recess 9. The ring or rim 10 left around recess 9 is held in such position relative to eccentric disc 6 that only one side of this ring is in contact with eccentric disc 6, while the remaining part of said ring is free from such contact. Owing to this arrangement, pin 7 is caused to rotate upon rotation of eccentric disc 6. The other end of pin 7, which is turned away from eccentric disc 6, is also provided with a recess denoted by reference numeral 11. A conical point 12 of transmission pin or rod 13, projects into said recess 11 of pin 7. In order to keep friction as low as possible, the angle of recess 11 is larger than the angle of conical end portion 12. This relation of angles is the same also in the other pins of the gear.

Pin 13 is spring pressed in the direction to pin 7 and thus also in the direction of eccentric disc 6, and this results in participation of pin 13 in the rotating movement of pin 7. This has no undesired effect, because the other end of pin 13 is also provided with a conical point 14, which is guided in a recess of the next transmission member. The member of the transmission system following transmission pin 13 is an angle lever 15, 16, which is capable of swinging around bolt 17 arranged in the vertex of the angle. In the embodiment shown in the drawings, this angle is of about 90°. One end of said angle lever, adjoining end 14 of pin 13, is provided with a disc 18, which can be rotated around a centrally arranged bolt 181 and can be adjusted by rotating the same. Disc 18 has an eccentrically located recess 182, which serves as a bearing surface for point 14 of pin 13. Adjustment is effected in order to obtain correct operation in transmission by the gear and to compensate for errors occurring in manufacture, and other variations. The adjusted position is stabilized by means of a screw 19. The free end of lever arm 16 is provided with a recess 20, which serves as a bearing for point 22 of a lifting pin 21, which can be displaced by lever 15, 16. Point 22 of pin 21 is pressed by the effect of spring 28 toward lever arm 16.

The member proper for effecting displacement of objective board 31 in accordance with the distance of the object, has a casing-like design. This casing has to provide for displacement of objective board 31 with complete freedom from jamming and without tilting. Board 31, which has to be displaced, is drawn by springs 32 in the direction of base plate 30. Board 31 is guided in its motion by pins 33 and these pins are guided, in the embodiment shown, in guide sleeves or tubes 34, which are immovably fastened to base plate 30. Two pins 35 having points at both of their ends, effect advance of objective board 31. The upper points of these pins 35 engage adjusting screws 37, which are screwed into objective board 31. These screws 37 serve for exact adjustment of the height of the stroke.

A link 26 is pivotally fastened at one side of base plate 30, and the free end of this link is located at the opposite end of the guide box or casing. Link 26 is there engaged by the above described lifting device and caused to swing upward. Link 26 surrounds the optical path which must be necessarily kept free and it has a ring- or frame-like design in the embodiment shown. In the center of its lateral parts, it has recesses 40, which receive the lower points of pins 35. Thus, pins 35 are the last intermediate members in the transmission system between eccentric disc and objective board 31. Springs 32 draw link 26 too into the lower normal position, which corresponds to the infinity position of the objective: thus displacement takes place against the impulse of springs 32. Arm 16 of angle lever 15, 16, and link 26 carry out movements in the same direction in the embodiment shown; however, it is nevertheless advisable to insert intermediate members between said two organs in order to avoid wear caused by direct engagement of angle lever 16 and link 26. An additional transmission member 21 is used, and in this way, all points of friction are eliminated. The end of link 26 which is opposite to the pivot, is correspondingly designed. It has a part 25, which extends in a right angle to the link and a further part 24, which forms a right angle with part 25, a recess 23 of which is adapted to receive pin 21. Parts 24 and 25 may be integral parts of link 26 or they may be firmly connected with it. Thus, if angle lever 15, 16 is caused to swing, pin 21 is lifted simultaneously, and link 26, parts 25, 24 of which form a bridge to the pin, is likewise lifted.

Figure 4 shows incorporation in a roll film camera, of the device illustrated in Figure 3. Adjustment is effected by turning knob 1 by adjusting the rangefinder to sharp focusing. Knob 1 is connected with eccentric disc 6, while eccentric disc 3 for actuating members of the rangefinder, is omitted in this figure for the sake of clarity. Transmission rod 7 extends from said eccentric disc 6, through bearing 8 to the adjusting device proper, which is illustrated in detail in Figure 3.

It will be understood that this invention is not limited to the specific details, steps and the like described above and illustrated in the drawings and may be carried out with various modifications without departing from the scope of the invention as defined in the appended claims.

What is claimed is:

1. In a device for the adjustment of the objective in photographic cameras, in combination an objective board or carrier and a base plate, said objective board being provided with guide means within the camera for parallel displacement and drawn by spring effect toward said base plate, said guide means comprising a plurality of parallel guide elements extending between the objective board and base plate, and arranged to surround the optical path of the camera; a lever and pin system comprising levers and pointed rod members positively held between and engaging members of said system; the last member of said system behind the objective consisting of a frame-like one-armed lever member which completely surrounds the optical path, is arranged within said guide means and is pivotally fastened to the camera; pivotal movement originating from the free end of said frame-like lever, being transmitted to the objective carrier by at least two rods having pointed ends and being arranged parallel with said guide elements, said pointed ends positively engaging the objective carrier and said frame-like lever, respectively, in order to effect displacement of the objective.

2. A device as claimed in claim 1, in which the frame-like one-armed lever is drawn by a spring toward the camera, and engaged at an angle-shaped end portion of its free end by one pointed end of a transmission rod having two pointed ends, the other end of said rod engaging one arm of an angle lever capable of swinging around a bolt arranged in the vertex of the angle, the swinging movement of which is transmitted by said rod to said frame-like lever, the other arm of said angle lever being engaged by one pointed end of a first rod arranged parallel with the objective carrier, the other end of said first rod being likewise pointed and engaging one end of a second pin or rod aligned with said first rod, said second rod being axially guided and being displaceable, by the action, on its second end, of a driving member.

3. A device as claimed in claim 1, in which the frame-like one-armed lever is drawn by a spring toward the camera, and engaged at an angle-shaped end portion of its free end by one pointed end of a transmission rod having two pointed ends, the other end of said rod engaging one arm of an angle lever capable of swinging around a bolt arranged in the vertex of the angle, the swinging movement of which is transmitted by said rod to said frame-like lever, the other arm of said angle lever being engaged by one pointed end of a first rod arranged parallel with the objective carrier, the other end of said first rod being likewise pointed and engaging one end of a second pin or rod aligned with said first rod, said second rod being axially guided and displaceable by the action, on its second end, of a driving member; said one end of said second rod being provided with a conical recess adapted to receive said other end of said first rod, said second end of said second rod being provided with a cylindrical bore, and said driving member consisting of an eccentric disc which is adapted to engage the annular end portion of the second rod and to cause rotation of this rod in addition to its axial displacement.

4. A device as claimed in claim 1, in which the frame-like one-armed lever is drawn by a spring toward the camera, and engaged at an angle-shaped end portion of its free end by one pointed end of a transmission rod having two pointed ends, the other end of said rod engaging one arm of an angle lever capable of swinging around a bolt arranged in the vertex of the angle, the swinging movement of which is transmitted by said rod to said frame-like lever, the other arm of said angle lever being engaged by one pointed end of a first rod arranged parallel with the objective carrier, the other end of said first rod being likewise pointed and engaging one end of a second pin or rod aligned with said first rod, said second rod being axially guided and displaceable by the action, on its second end, of a driving member; said one end of said second rod being provided with a conical recess adapted to receive said other end of said first rod, said second end of said second rod being provided with a cylindrical bore, and said driving member consisting of an eccentric disc which is adapted to engage the annular end portion of the second rod and to cause rotation of this rod in addition to its axial displacement; said other arm of said angle lever containing a disc which is provided with a recess for receiving said pointed end of said first rod, said disc being rotatable in said other arm of the angle lever in order to adjust position of said recess.

References Cited in the file of this patent

UNITED STATES PATENTS

| Number | Name | Date |
|---|---|---|
| 989,784 | Kaemmerer | Apr. 18, 1911 |
| 1,115,011 | Patterson | Oct. 27, 1914 |
| 1,149,401 | Ott et al. | Aug. 10, 1915 |
| 1,746,083 | Kurtz | Feb. 4, 1930 |
| 1,981,185 | Mitchell | Nov. 20, 1934 |
| 2,085,468 | Nagel | June 29, 1937 |
| 2,305,301 | Maniya | Dec. 15, 1942 |
| 2,378,282 | Brueske | June 12, 1945 |
| 2,401,746 | Castedello | June 11, 1946 |
| 2,484,072 | Castedello | Oct. 11, 1949 |
| 2,520,296 | Williams | Aug. 29, 1950 |

FOREIGN PATENTS

| Number | Country | Date |
|---|---|---|
| 639,391 | Germany | Dec. 4, 1936 |
| 941,726 | France | Aug. 9, 1948 |